United States Patent [19]

Kronzer et al.

[11] Patent Number: 4,599,801
[45] Date of Patent: Jul. 15, 1986

[54] PORTABLE GAGE INSTRUMENT FOR USE IN PERFORMING PRECISION MULTIPLE DIMENSION MEASUREMENTS

[75] Inventors: Phillip J. Kronzer, Los Gatos; Nick Caputo, San Jose; Bernard M. Combs, Los Altos; Andrew Conrad, Campbell; James Kalani; Timothy L. Kronzer, both of Los Gatos, all of Calif.

[73] Assignee: K & K Manufacturing, Inc., Campbell, Calif.

[21] Appl. No.: 663,379

[22] Filed: Oct. 22, 1984

[51] Int. Cl.$^4$ .................... G01B 3/20; G01B 5/02
[52] U.S. Cl. .................................. 33/169 R; 33/548
[58] Field of Search ............... 33/168 B, 169 R, 170, 33/175, 548, 567

[56] References Cited

U.S. PATENT DOCUMENTS

| | | | |
|---|---|---|---|
| 1,608,771 | 11/1926 | Cary | 33/169 R |
| 2,537,704 | 1/1951 | Reinhart et al. | 33/169 R |
| 3,251,133 | 5/1966 | Turtschan | 33/169 R |
| 3,313,030 | 4/1967 | Heys | 33/169 R |
| 3,319,339 | 5/1967 | Marconi | 33/169 R |
| 4,170,068 | 10/1979 | Forsman | 33/169 R |
| 4,326,336 | 4/1982 | Hreha | 33/548 |

Primary Examiner—Richard R. Stearns
Attorney, Agent, or Firm—Claude A. S. Hamrick

[57] ABSTRACT

A portable precision measuring gage device for permitting rapid measurement of multiple dimensions of a work piece. The device includes a base, a plurality of guides held in an aligned position and a plurality of slides at least one of which is associated with each guide. Each slide includes upper and lower precision ground pads that are mounted on the top and bottom, respectively, of an outward extension of the slide so as to permit easy access for transfer measurement or for direct measurement of a selected dimension of a part. Each slide can be moved relative to its guide so that a dimension can be precisely transferred from a measuring standard to set the precise location of a pad, either upper or lower. The slide is then locked in position and the device can be readily hand carried to an inspection station, usually in a production area, where in-process and/or final precision inspections may be performed.

4 Claims, 21 Drawing Figures

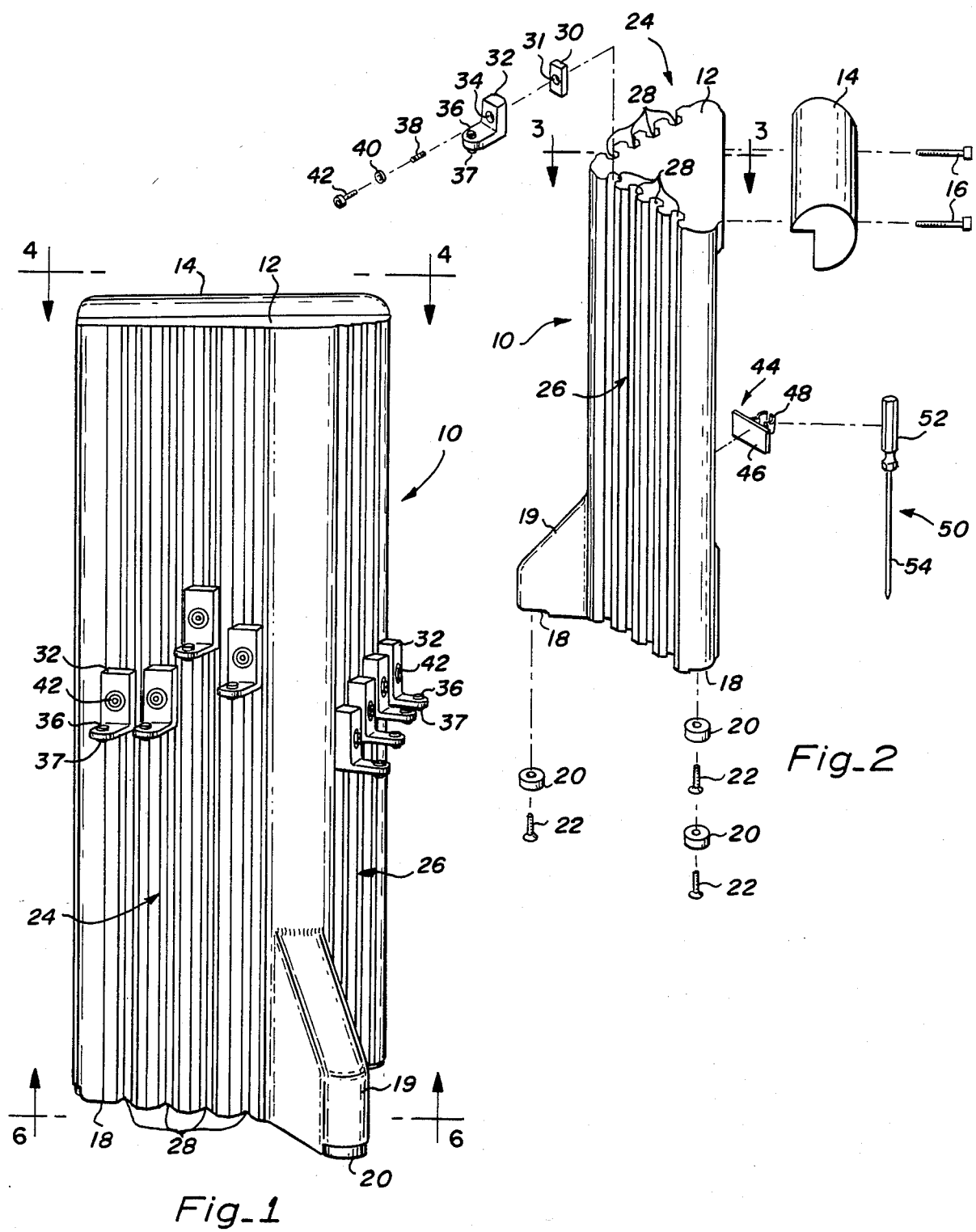
Fig_1
Fig_2

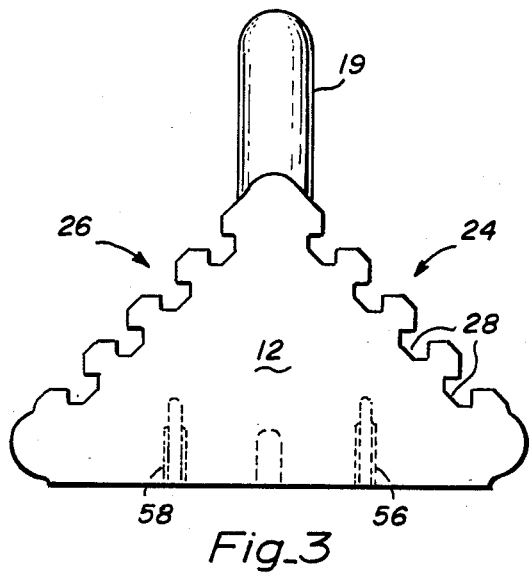
Fig_3
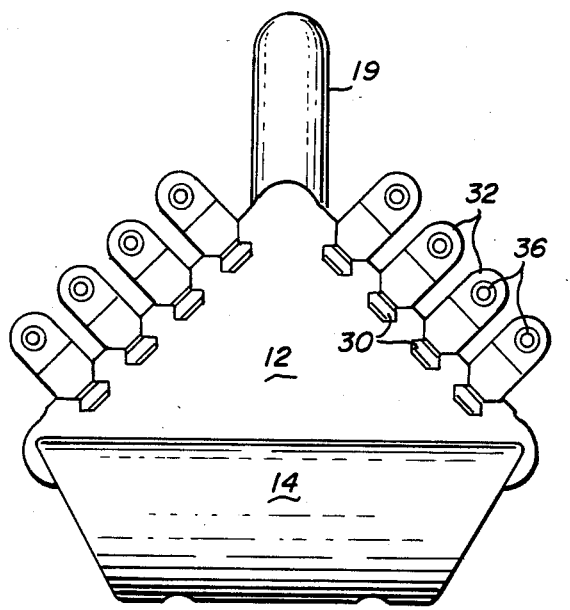
Fig_4
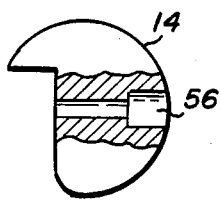
Fig_5
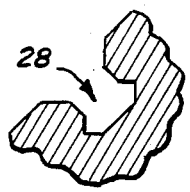
Fig_7
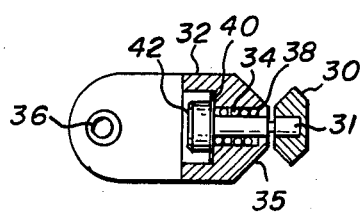
Fig_8
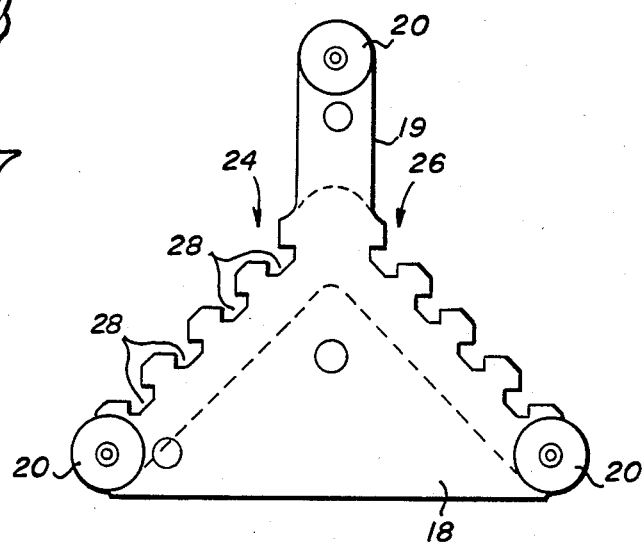
Fig_6

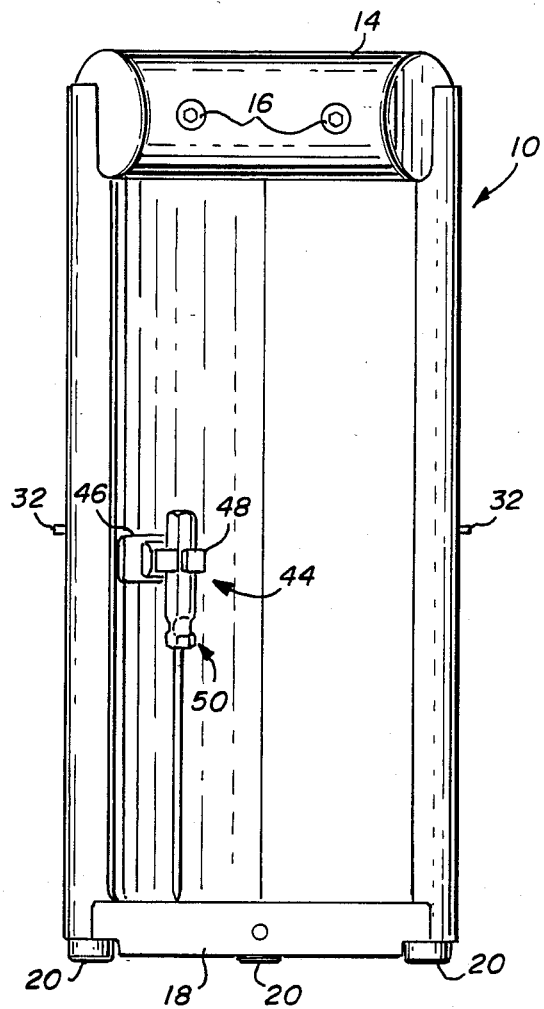
Fig_9
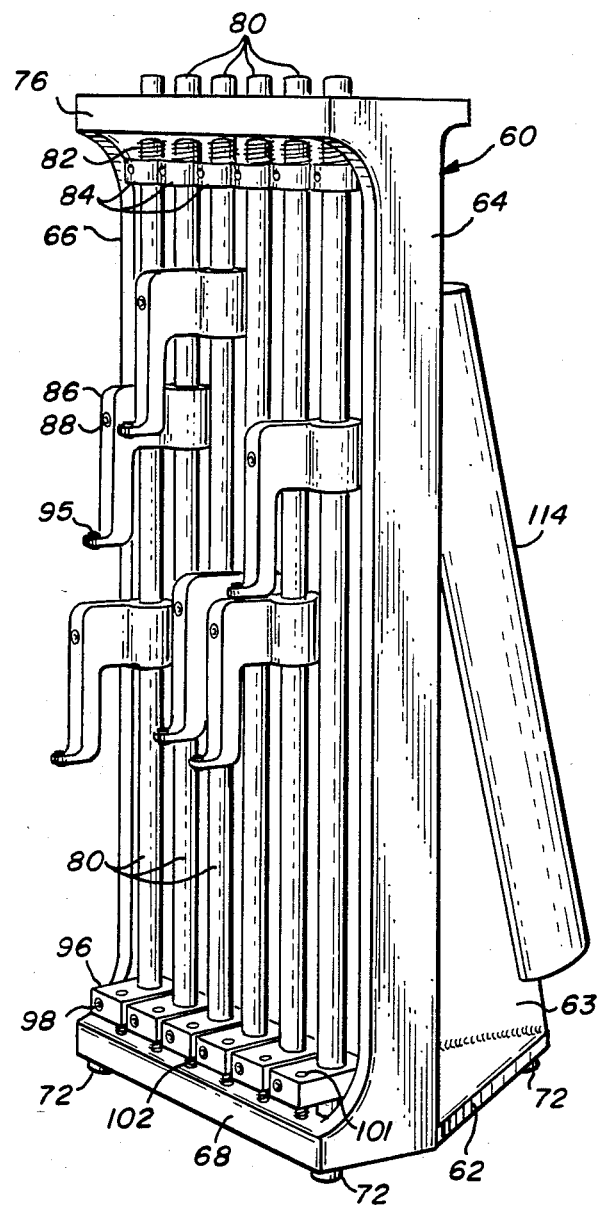
Fig_10

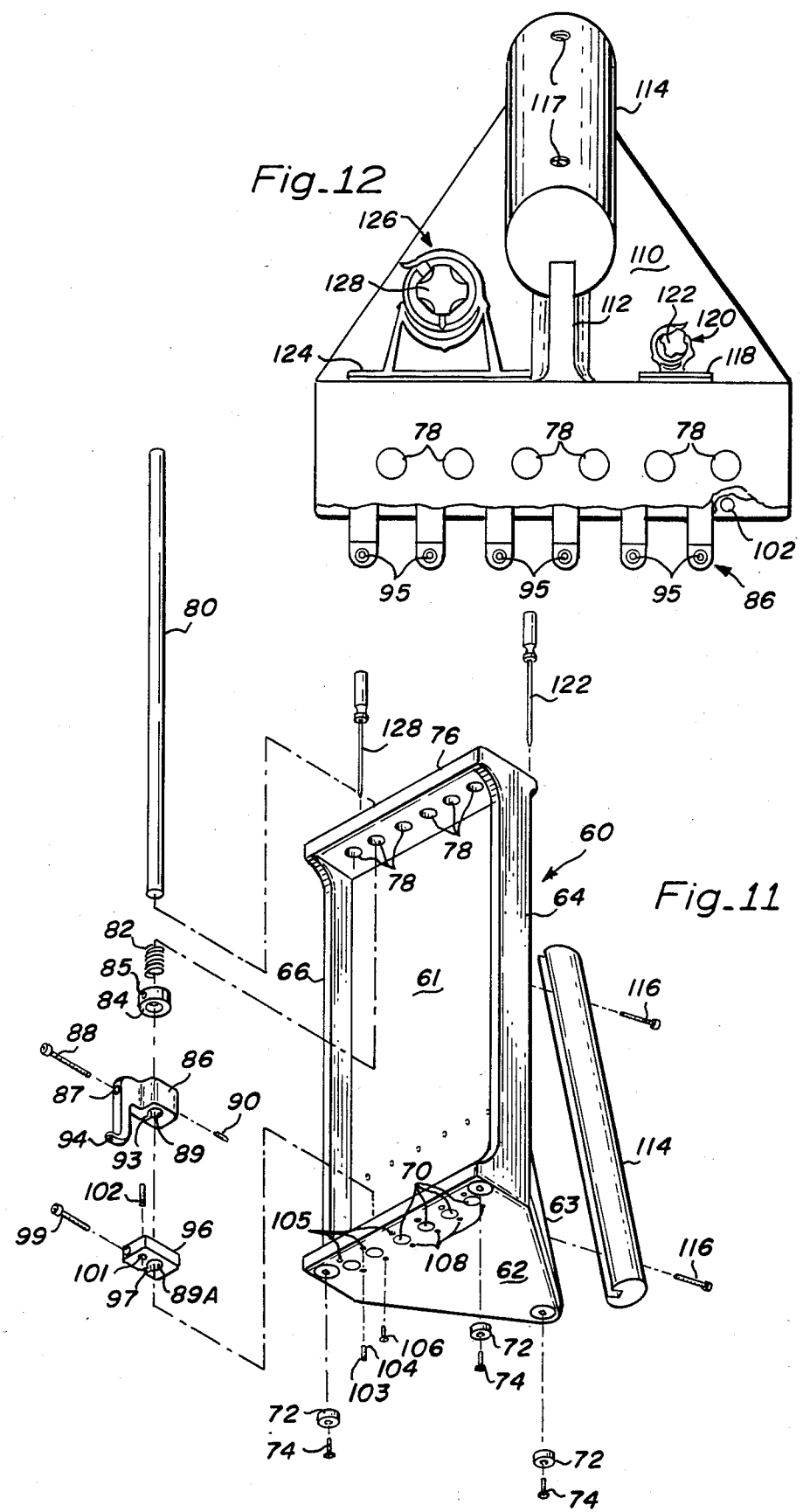

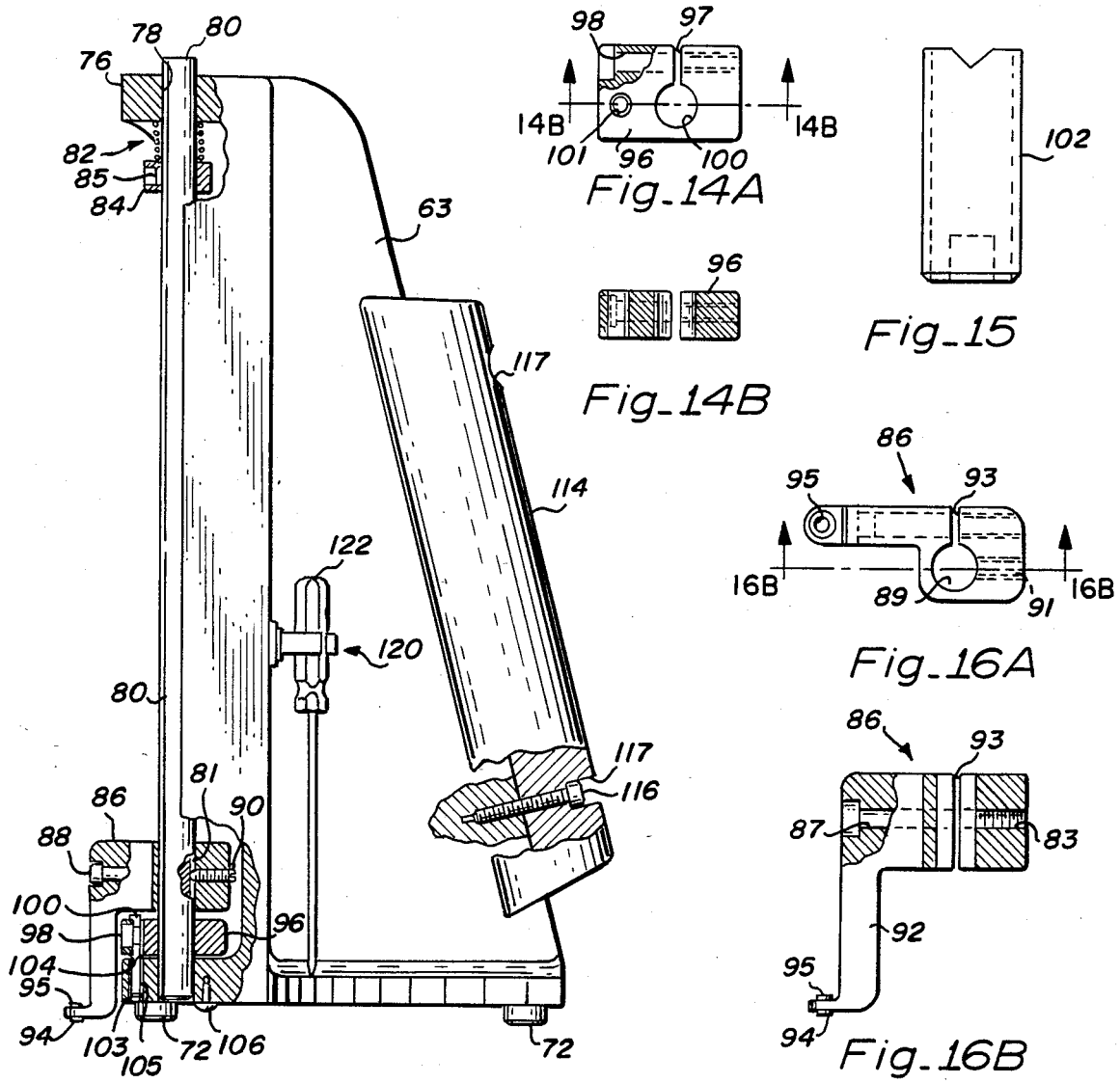
Fig_13, Fig_14A, Fig_14B, Fig_15, Fig_16A, Fig_16B, Fig_17
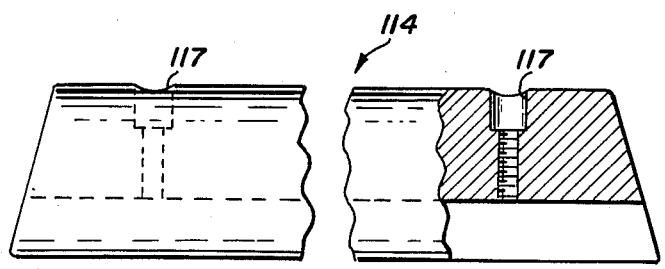
Fig_18
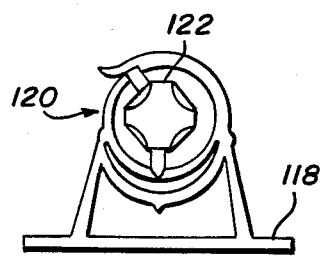
Fig_19

PORTABLE GAGE INSTRUMENT FOR USE IN PERFORMING PRECISION MULTIPLE DIMENSION MEASUREMENTS

BACKGROUND OF THE INVENTION

1. Field of the Invention

This invention relates to measuring equipment for performing precision inspection operations of a repetitive nature, most commonly performed on precision surface plates and, in particular, to a portable measuring instrument designed for use as a reference in performing a multiplicity of such inspections.

2. Description of the Prior Art.

Precision measuring devices of the prior art include the Cadillac Height Master gage, calibrated gage block sets, digital height gages, etc., which are expensive and, in some cases, require a considerable amount of set up time. Such devices may be used in shop areas of a manufacturing plant to perform a limited number of in-process inspections, but because of their high cost, they are most often confined to an inspection department, laboratory or tool room area. Thus, precision in-process inspections are not usually performed and final inspections are most often performed on a statistical basis because of the problems associated with moving the production parts to a laboratory or tool room area for inspection. For this reason, the measurement may only be determined on a statistical basis whether a product run or production batch meets the design tolerances established for the product. Further, such procedures do not provide the number of inspections that may be necessary. Moreover, such procedures do not point up during the course of production the area in which production tolerances are exceeded. The use of precision measurement reference and measurement for in-process inspection is quite useful because appropriate tests may be performed in the production area and cause a reduction in manufacturing costs as defects are discovered and correction effected early in the production process. Further, it may be possible to effect a correction before a process goes completely out of tolerance thus saving a production run.

SUMMARY OF THE PRESENT INVENTION

It is an object of the invention to provide a reference gauge including a plurality of precisely set anvils from which multiple precision dimension measurements may be made during in-process or final inspection of a manufactured part.

It is another object of the invention to provide a portable, multiple dimension, precision measuring device.

Briefly, the measuring device of the present invention comprises a base, a plurality of guides attached to the base, one or more slides adapted for slideable engagement with each guide, and means for securing each slide in a selected position on a particular guide so as to provide a precision selected reference.

IN THE DRAWING

FIG. 1 is a perspective view of one embodiment of the invention;

FIG. 2 is an exploded perspective view of the embodiment of FIG. 1;

FIG. 3 is a top view of the base member (10) which illustrates in more detail the generally triangular shape of the base (10), the forward foot (19) and the dovetailed guides (28);

FIG. 4 is a top view of the FIG. 2 embodiment which illustrates the interrelationship of the slides to the base (10) and the handle (14) which is attached to top member (12);

FIG. 5 is an end view of the handle (14);

FIG. 6 is a bottom view of the base (10) and illustrates the foot pads (20);

FIG. 7 is an expanded cross-sectional view of a guide (28);

FIG. 8 is a cross-sectional view of a slide (32) and illustrates the slide retainer (30), the spring (38), the locking screw (42), and the anvil or precision pad (36);

FIG. 9 is a rear view of the FIG. 1 embodiment and illustrates the triangular interior and the clamping member (44) for holding the setting tool (50);

FIG. 10 is a perspective view showing an alternative embodiment of the invention;

FIG. 11 is an exploded perspective view of the embodiment of the invention shown in FIG. 10;

FIG. 12 is a partially broken top view of the alternative embodiment and illustrates the relative locations of the slides (86), the triangular rear portion which includes the web (112) upon which handle (114) is mounted, and clamps (120) and (126) for holding setting tools (122) and (128), respectively;

FIG. 13 is a partially broken side view of the alternative embodiment illustrating the spring-loaded upper clamping mechanism and the bottom clamp (96) including a precision adjustment arrangement;

FIG. 14A is a partially broken top view of a bottom clamp (96);

FIG. 14B is a cross-sectional view taken along the line 14B—14B of FIG. 14A;

FIG. 15 is an expanded side view of a set screw saddle (102);

FIG. 16A is a top view of a slide (86);

FIG. 16B is a partially sectioned side view of the slide of FIG. 16A along the line 16B—16B;

FIG. 17 is a broken view of a shaft (80) illustrating the ball groove (92);

FIG. 18 is a broken partially sectioned side view of the handle (114); and

FIG. 19 is a top view of the clamp (120) and setting tool (122).

DETAILED DESCRIPTION OF THE PREFERRED EMBODIMENT

Referring now to FIGS. 1-9 in conjunction with the following discussion, will lead to an understanding of one of the preferred embodiments of the instant invention. A substantially triangular base member 10 has a top 12 to which is attached a handle 14 (see FIG. 9) by means of screws 16 (FIG. 12). Foot pads 20 (see also FIG. 6) are attached by means of screws 22 (FIG. 2) to the rear portion of bottom surface 18 and to the forward portion of a front leg 19.

Each of the front sides 24 and 26 of base member 10 include a plurality of vertically extending guide slots 28. Slide members 32 are mated to a particular guide slot by means of retainers 30 (FIG. 2) designed for slideable engagement with the guide slot. Each slide retainer 30 includes a threaded aperture 31 for receiving a set screw 42. Slides 32 include upper and lower anvils, or precision pads, 36 and 37. Each slide 32 further includes an annular bore 34 (see FIG. 8) having a diameter that is substantially larger than the diameter of the shaft of screw 42 so as to accommodate a coil spring 38. Bore 34 terminates in a shoulder 35 at the rear thereof which provides a stop for the rear end of spring 38. Set screw 42 passes through the aperture in a washer 40 which provides a forward stop for spring 38. The distal end of screw 42 is threaded to mate with the threaded aperture 31 of slide retainer 30 to provide a clamping force for locking the slide in place. When the setting screw is loosened, slide 32 may be moved up and down, using only finger pressure. This allows the slide and its associated precision pads to be quickly moved for positioning at an assigned location.

For the convenience of the user, an adjusting tool 50 is mounted to the back of the device, as shown at 44 in FIG. 9, by means of a bracket 46 having a resilient gripping 48 which clampingly engages the handle of the tool 50 when it is not in use.

As may be understood by those skilled in the art, the precision dimension between the table top on which the device rests and the pads 36 and 37 is initially established using a laboratory standard device such as a Height Master, gage block stack or a digital measuring device. The laboratory standard and the portable instrument of the instant invention are intially positioned on a Micro Flat surface plate, or a micro flat, and a transfer tool indicator is set to the preset height of the standard. Following this, the set screw of a slide is loosened by means of a setting tool 50 so that the slide may be moved up or down under finger pressure. The slide is then positioned to the approximate height desired and the transfer tool is positioned so that its indicator point will be adjacent the position of a precision pad 36 (37), and the slide is moved in its slot until the pad 36 (37) just touches the indicator point. The set screw 42 is then partially tightened to a degree such that it is possible to move the slide under a force that is greater than that exerted by finger pressure. The slide is then tapped with the plastic handle 52 of the setting tool 50 until the indicator shows that the slide is at the exact height desired. The set screw 42 is then fully tightened and the reading of the indicator of the transfer tool is again checked. If the reading of the indicator did not change, then the slide is at the desired preset position. On the other hand, if the reading of the indicator has changed more than is acceptable, then the set screw 42 must be loosened slightly to allow the slide to be moved by tapping with the handle 52 to bring the slide into the desired position.

It will be appreciated that each of the eight (or more) slides can be preset at one time for subsequent use in making several precision measurements. Furthermore, it should be noted that any one of the slides can be repositioned without affecting in any way any of the other slides.

Referring now to FIGS. 10-19 in conjunction with the following discussion, a second embodiment of a portable instrument for multiple dimension precision measurements in accordance with this invention will be described. This embodiment differs from the first embodiment primarily in that it provides for precision mechanical adjustment of the slides relative to the base. The device includes, as shown in the exploded view of FIG. 11, a substantially upright rectangular base 60 having a rectangular back wall portion 61, a generally triangular bottom member 62 and a pair of oppositely disposed side walls 64 and 66. A vertically extending web member 63 joins the back 61 and bottom 62. A bottom lip 68 extends forwardly from the bottom member 62 and includes a plurality of shaft receiving apertures 70 each of which accommodates a vertically extending shaft 80. A foot pad 72 is positioned adjacent each apex of the bottom portion and is secured thereto by means of a mounting screw 74.

A top lip 76 extends forwardly from the back and side walls 61, 64 and 66 and lies in a plane that is parallel with the plane of the bottom lip 68. The top lip 76 also includes a plurality of shaft receiving apertures 78 each of which is in vertical alignment with a corresponding aperture in the bottom lip 68. The diameters of the apertures in the top and bottom lips are selected slideably to accommodate a shaft 80. The lower end of each shaft is prevented from extending beyond the lower extremity of the lower aperture by a button head screw 106 mounted in a threaded bore 108 adjacent the shaft aperture. The shafts 88 are provided with a longitudinally extending groove 81 (see FIG. 13) on their back sides, the purpose of which is explained below.

As a shaft is in inserted through a shaft aperture in the upper lip 76, a coiled spring 82 is passed over the shaft and is followed by an upper collar 84. Next, at least one slide 86 is passed over the shaft end as it is pushed down through the aperture 78. A lower clamp 96 is thereafter passed over the end of the shaft just before it is inserted into the associated shaft aperture 70 in the bottom lip 68. Once the shaft is in position and rests against the head of a screw 106, the collar 84 is moved upwardly until it compressed the associated spring 82 by a selected amount. A set screw 85 is then advanced to lock the collar in position on the shaft. The resultant reaction of the spring 82 between the lip 76 and collar 84 causes the shaft 80 to be resiliently biased downwardly into engagement with the stop screw 106.

As shown in FIG. 11, and in more detail in FIGS. 16A and 16B, slides 86 each include a horizontally extending bore 87 which is threaded at the rear portion 83 thereof to mate with the threads of socket head clamping screw 88, and includes a recess at the forward end to accept the head of screw 88. A vertically extending bore 89 is also formed in slide 86 to slideably accept the shaft 80. A slit 93 extends through the side of the slide to the bore 89. Thus, tightening of the clamping screw 88 will compress aperture 89 about shaft 80 thereby holding the slide in a fixed position. The slide 86 also include a downardly and forwardly extending leg 92 the distal extremity of which have a bottom pad 94 and an upper pad 95 each of which are flame hardened to decrease wear during measurement useage, thereby maintaining the integrity of the measurement.

A second threaded bore 91 extends through the rear side of slide 86 and into the vertical bore 89. A ball plunger 90 is threaded into bore 91 so as to engage with the ball groove 81 in shaft 80, thus allowing the slide 86 to be moved along the length of the shaft but preventing it from rotating relative thereto.

The details of the lower clamp 96 are shown in FIGS. 14A and 14B, and as illustrated, the clamp includes a horizontally extending bore 98 which is threaded at its rearmost extremity and is adapted to matingly receive a socket headclamping screw 99 (FIG. 11). A shaft receiving bore 100 extends vertically through the device and a slit 97 extends through one side thereof to bore 100. A tapped bore 101 passes vertically through a forward portion of the clamp for receiving a fine adjust cone point socket-head set screw 102 (FIG. 11).

Set screws 103 having a saddle configured upon end 104 (FIG. 13) are inserted into threaded apertures 105 so as to provide bases for engagement by the fine adjustment set screws 102 of the lower clamping members 96. In order to allow both up and down adjustment, the shafts 80 must be initially positioned so that their lower ends are slightly above the stop screws 106 in the bottom of the member 62. This is accomplished by raising the shafts 80 a slight amount before tightening the lower calmps 96. Since the collar 84 is now in compressive engagement with spring 82, a downward pressure is continuously asserted on the shaft holding it in position with the cone shaped end of screw 100 engaging the saddle 104. Accordingly, by rotating screw 100 small adjustments of a shaft 80 and any slides carried threby may be effected.

To facilitate carrying of the precision instrument, a handle 114 is attached to the web 63 by means of screws 116 which are passed through counter sunk bores 117 into threaded bores formed in web 63.

As with the first described embodiment, adjustment tools may be affixed to the back of the device as illustrated at 120 (FIGS. 12 and 13) and 126 (FIG. 12). In each case, a suitable holder (118 and 124) is affixed to the rear wall surface for holding a particular tool (122 and 128 respectively).

In use, when it is desired to adjust a slide to a particular dimension for use in inspection testing operations, a technique similar to that described hereinabove with respect to the first embodiment is employed. First, a standard precision measuring device such as a Height Master, gage block stack or digital measuring device is positioned on a table top and set to a desired height. A transfer tool indicator is then set to the desired height established by the setting device. Then the appropriate slide 86 is freed by loosening the screw 88 so that the slide may be moved by finger pressure to the approximate set point. With the transfer tool positioned so that the indicator point will meet the surface of the slide pad, the slide is moved along shaft 80 until the pad touches the indicator point, or is as close to that height as can be obtained by finger adjustment. Next, the clamping screw 88 is tightened to lock the slide 86 to the shaft 80. The fine adjustment screw 100 is then turned using the setting tool 122 to bring the slider to the desired height. This process is repeated for each slide that is to be set.

Note that it is possible to have more than one slide 86 on a shaft 80. In such case, it will be appreciated that the fine adjustment may only be used for one of the slides. The second slide must be normally positioned.

Although the invention has been described above in terms of two particular embodiments thereof, it is anticipated that numerous alterations and modifications thereof may become apparent to those skilled in the art after having read the above disclosure. It is therefore intended that the appended claims be interpreted as covering all such alterations and modifications as fall within the true spirit and scope of the invention.

What is claimed is:

1. A portable precision gage apparatus comprising:
   means forming a base to be placed upon a flat work surface, said base including means forming a plurality of vertically extending guide ways, said base being generally triangular in horizontal cross-section and including at least two groups of said guide ways, each group of which lies in a plane angularly intersecting another plane in which another group of said guide ways lies;
   a plurality of slide means adapted to mate with and be selectively positionable along respective ones of said guide ways, each of said slide means including means forming a precision measurement pad; and
   means for locking each of said slide means in a selected position along a corresponding guide way, whereby said gage apparatus may be subsequently moved to a different location at which the distances between a supporting surface and each of said pads may be used to provide precision reference dimensions.

2. A portable precision gage apparatus as set forth in claim 1 wherein each said guide way includes a dove-tailed slot adapted to mate with a portion of one or more of said slide means.

3. A portable precision gage apparatus as set forth in claim 2 wherein said slide means includes a guide way engaging surface and a separated retainer means adapted for insertion into one of said dove-tailed slots, said retainer means having a threaded bore formed therein; and
   screw means for matingly engaging said threaded bore and drawing it into frictional engagement with a surface forming said slot whereby said slide means may be locked in position relative to said slot or unlocked to permit a change in dimension to be set.

4. A portable precision gage apparatus as set forth in claim 1 wherein said base includes three supporting feet disposed at triangularly related points beneath the lower part of said base.

* * * * *